(12) United States Patent
Anegawa et al.

(10) Patent No.: US 10,906,242 B2
(45) Date of Patent: Feb. 2, 2021

(54) THREE-DIMENSIONAL SHAPING DEVICE

(71) Applicant: Seiko Epson Corporation, Tokyo (JP)

(72) Inventors: Kenta Anegawa, Matsumoto (JP);
Kohei Yuwaki, Tsukuba (JP); Yusuke Watanabe, Yokohama (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/856,130

(22) Filed: Apr. 23, 2020

(65) Prior Publication Data

US 2020/0338821 A1 Oct. 29, 2020

(30) Foreign Application Priority Data

Apr. 24, 2019 (JP) .................................. 2019-082907

(51) Int. Cl.
*B29C 64/209* (2017.01)
*B29C 64/393* (2017.01)
*B33Y 50/02* (2015.01)
*B33Y 30/00* (2015.01)

(52) U.S. Cl.
CPC .......... *B29C 64/209* (2017.08); *B29C 64/393* (2017.08); *B33Y 30/00* (2014.12); *B33Y 50/02* (2014.12)

(58) Field of Classification Search
CPC ... B29C 64/393; B29C 64/106; B29C 64/209; B29C 64/112; B29C 64/20; B29C 48/00; B29C 48/02
See application file for complete search history.

(56) References Cited

U.S. PATENT DOCUMENTS

| 3,790,328 A | 2/1974 | Maxwell | |
| 4,850,839 A * | 7/1989 | Cowley | B29C 48/475 425/142 |
| 2015/0321419 A1* | 11/2015 | Linthicum | B29C 48/397 264/308 |
| 2017/0210069 A1* | 7/2017 | Stubenruss | B29C 64/118 |

FOREIGN PATENT DOCUMENTS

| EP | 3 446 853 A1 | 2/2019 |
| JP | 2017-035811 A | 2/2017 |

\* cited by examiner

*Primary Examiner* — Joseph S Del Sole
*Assistant Examiner* — Mohamed K Ahmed Ali
(74) *Attorney, Agent, or Firm* — Harness, Dickey & Pierce, P.L.C.

(57) ABSTRACT

Provided is a three-dimensional shaping device including a melting unit configured to melt a material into a shaping material, and a nozzle configured to discharge the shaping material supplied from the melting unit toward a stage. The melting unit includes a screw configured to rotate about a rotation axis and having a groove forming surface in which a groove to which the material is supplied is formed, a heating unit configured to heat the material supplied to the groove, a barrel having a facing surface that faces the groove forming surface and provided with a communication hole that communicates the facing surface with the nozzle, and a discharge amount adjustment mechanism provided in the communication hole and configured to adjust a flow rate of the shaping material discharged from the nozzle.

4 Claims, 8 Drawing Sheets

THREE-DIMENSIONAL SHAPING DEVICE

The present application is based on, and claims priority from JP Application Serial Number 2019-082907, filed Apr. 24, 2019, the disclosure of which is hereby incorporated by reference herein in its entirety.

BACKGROUND

1. Technical Field

The present disclosure relates to a three-dimensional shaping device.

2. Related Art

For example, JP-A-2017-035811 discloses a three-dimensional shaping device that includes a nozzle that discharges a melt material and a suction unit that suctions the material in the nozzle. In the three-dimensional shaping device, it is desired to prevent stretching of a material which stretches like a thread between a three-dimensional shaped object and the nozzle by driving the suction unit and suctioning the material in the nozzle when the nozzle is moved away after the material is discharged from the nozzle.

In the three-dimensional shaping device described above, for example, when the time required for the movement of the nozzle is long, the material may be unintentionally discharged from the nozzle. Therefore, there is a possibility that the material discharged from the nozzle unintentionally adheres to the three-dimensional shaped object, thereby reducing the dimensional accuracy of the three-dimensional shaped object.

SUMMARY

According to one aspect of the present disclosure, a three-dimensional shaping device is provided. The three-dimensional shaping device includes a melting unit configured to melt a material into a shaping material, and a nozzle configured to discharge the shaping material supplied from the melting unit toward a stage. The melting unit includes a screw configured to rotate about a rotation axis and including a groove forming surface in which a groove to which the material is supplied is formed, a heating unit configured to heat the material that is supplied to the groove, a barrel having a facing surface that faces the groove forming surface and provided with a communication hole that communicates the facing surface with the nozzle, and a discharge amount adjustment mechanism provided in the communication hole and configured to adjust a flow rate of the shaping material discharged from the nozzle.

DESCRIPTION OF EXEMPLARY EMBODIMENTS

A. First Embodiment

Figure 1:
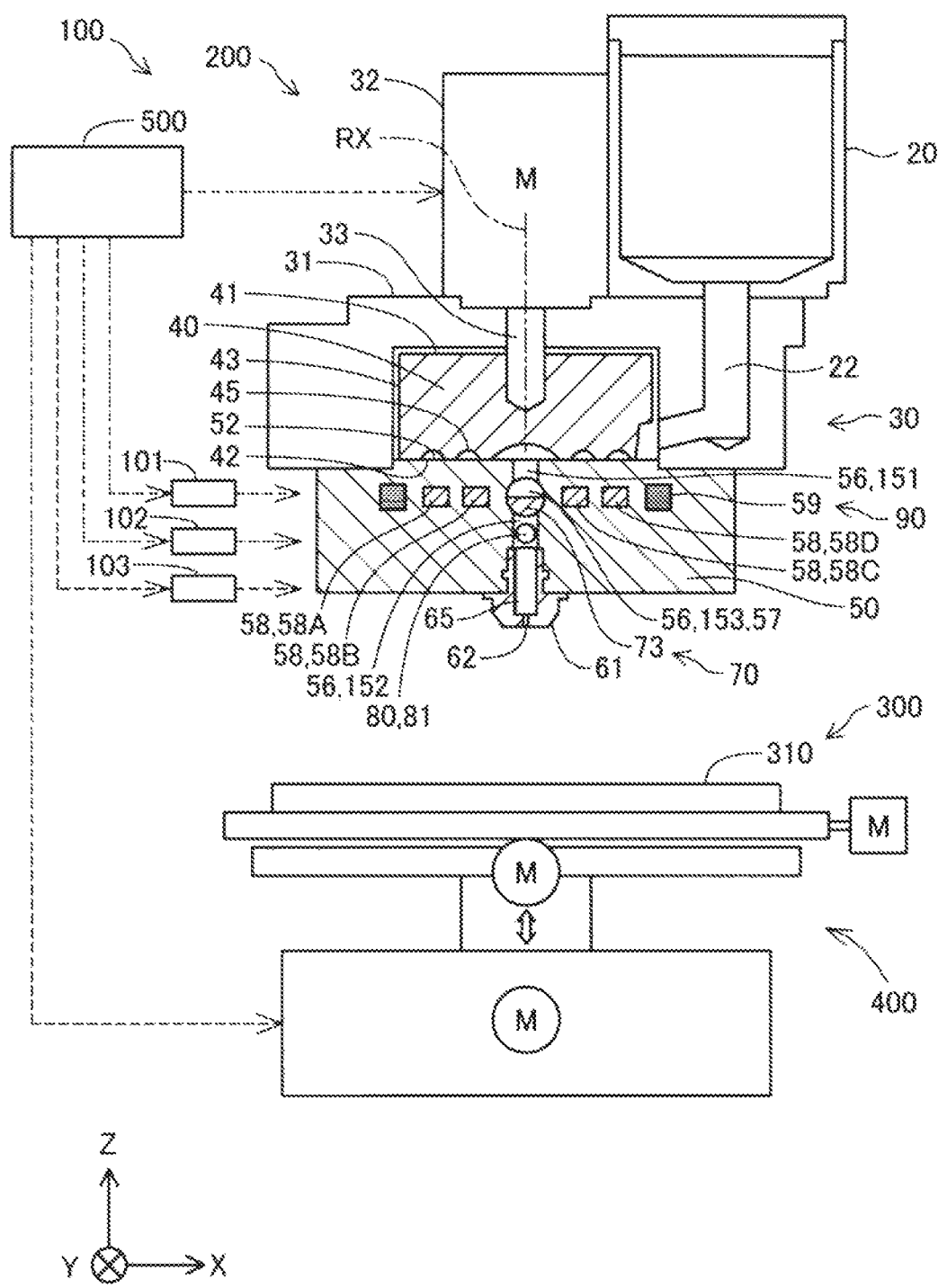
FIG. 1 is an illustrative diagram showing a schematic configuration of a three-dimensional shaping device according to a first embodiment.

FIG. 1 is an illustrative diagram showing a schematic configuration of a three-dimensional shaping device 100 according to the first embodiment. In FIG. 1, arrows along X, Y, and Z directions which are orthogonal to each other are shown. The X direction and the Y direction are directions along a horizontal direction and the Z direction is a direction along a vertical direction. In other drawings, the arrows along the X, Y, and Z directions are shown as appropriate. The X, Y, and Z directions in FIG. 1 indicate the same directions as the X, Y, and Z directions in other drawings.

The three-dimensional shaping device 100 according to the present embodiment includes a shaping head 200, a stage 300, a moving mechanism 400, and a control unit 500. Under control of the control unit 500, the three-dimensional shaping device 100 drives the moving mechanism 400 to change a relative position between a nozzle 61 and a shaping surface 310 while discharging a shaping material from the nozzle 61 provided in the shaping head 200 toward the shaping surface 310 of the stage 300 to shape a three-dimensional shaped object having a desired shape on the shaping surface 310.

The moving mechanism 400 changes a relative position between the nozzle 61 and the shaping surface 310. In the present embodiment, the moving mechanism 400 changes the relative position between the nozzle 61 and the shaping surface 310 by moving the stage 300 with respect to the shaping head 200. The moving mechanism 400 in the present embodiment is constituted by a three-axis positioner that moves the stage 300 in three axial directions that are the X direction, the Y direction and the Z direction by driving force of three motors. Each motor is driven under control of the control unit 500. Instead of moving the stage 300, the moving mechanism 400 may be configured to change the relative position between the nozzle 61 and the shaping surface 310 by moving the shaping head 200 without moving the stage 300. Further, the moving mechanism 400 may be configured to change the relative position between the nozzle 61 and the shaping surface 310 by moving both the stage 300 and the shaping head 200.

The control unit 500 is constituted by a computer including one or more processor, a main storage device, and an input and output interface that inputs and outputs signals from and to the outside. In the present embodiment, the control unit 500 controls operations of the shaping head 200 and the moving mechanism 400 by executing a program or a command read on the main storage device with the processor, thereby executing a shaping processing for forming the three-dimensional shaped object. The operations include movement of a three-dimensional relative position between the shaping head 200 and the stage 300. The control unit 500 may be constituted by a combination of a plurality of circuits instead of the computer.

The shaping head 200 includes a material supply unit 20 which is a material supply source, a melting unit 30 that melts a material supplied from the material supply unit 20 to make the material into a shaping material, and the nozzle 61 that discharges the shaping material supplied from the melting unit 30. The material supply unit 20 contains a material in a state of pellets, powder, or the like. In the present embodiment, an ABS resin formed in the shape of a pellet is used as the material. The material supply unit 20 in the present embodiment is constituted by a hopper. A supply path 22 that couples the material supply unit 20 to the melting unit 30 is provided below the material supply unit 20. The material supply unit 20 supplies the material to the melting unit 30 via the supply path 22.

The melting unit 30 includes a screw case 31, a drive motor 32, a flat screw 40, and a barrel 50. The melting section 30 melts at least a part of the material in a solid state supplied from the material supply unit 20 into a shaping material in a paste form having fluidity, and supplies the molten material to the nozzle 61. The flat screw 40 is sometimes simply referred to as a screw.

The screw case 31 is a housing that accommodates the flat screw 40. The barrel 50 is fixed to a lower surface of the screw case 31, and a flat screw 40 is accommodated in a space surrounded by the screw case 31 and the barrel 50. The drive motor 32 is fixed to an upper surface of the screw case 31. A shaft 33 of the drive motor 32 is coupled to an upper surface 41 side of the flat screw 40. The drive motor 32 is driven under the control of the control unit 500.

The flat screw 40 has a substantially cylindrical shape whose height in a direction along a central axis RX is smaller than a diameter. The flat screw 40 is disposed in the screw case 31 in a manner that the central axis RX is parallel to the Z direction. The flat screw 40 rotates around the central axis RX in the screw case 31 by a torque generated by the drive motor 32. The flat screw 40 includes a groove forming surface 42 in which a groove 45 into which a material is supplied is formed on a side opposite to the upper surface 41 in a direction along the central axis RX. The central axis RX may be referred to as a rotation axis. A specific configuration of the groove forming surface 42 will be described later.

The barrel 50 is disposed below the flat screw 40. The barrel 50 includes a screw facing surface 52 that faces the groove forming surface 42 of the flat screw 40. The barrel 50 is provided with a communication hole 56 communicating the screw facing surface 52 with the nozzle 61, and an intersecting hole 57 intersecting the communication hole 56. A part of the communication hole 56 intersecting the intersecting hole 57 is referred to as an intersecting portion 153. The communication hole 56 includes a first partial flow path 151 that is closer to the screw facing surface 52 than the intersecting portion 153, and a second partial flow path 152 that is further away from the screw facing surface 52 than the intersecting portion 153. In the present embodiment, the first partial flow path 151 and the second partial flow path 152 extend on the central axis RX of the flat screw 40 along the Z direction. The intersecting hole 57 extends along the Y direction. The screw facing surface 52 may be simply referred to as a facing surface. A specific configuration of the screw facing surface 52 will be described later.

The barrel 50 is provided with a discharge amount adjustment mechanism 70 that adjusts a flow rate of the shaping material discharged from the nozzle 61. The discharge amount adjustment mechanism 70 includes a valve portion 73 disposed in the intersecting hole 57 and a valve drive portion 101 that rotates the valve portion 73 in the intersecting hole 57. The valve drive portion 101 is configured by an actuator such as a stepping motor, and rotates the valve portion 73 under control of the control unit 500. A suction unit 80 is coupled to the second partial flow path 152 of the communication hole 56. The suction unit 80 suctions the shaping material from the second partial flow path 152. It can be said that the valve portion rotates within the intersecting portion 153 of the communication hole 56. A flow rate of the shaping material discharged from the nozzle 61 is also referred to as a discharge amount. A specific configuration of the discharge amount adjustment mechanism 70 and a specific configuration of the suction unit 80 will be described later.

The barrel 50 includes a heater 58 that heats the material supplied to the groove 45 of the flat screw 40. In the present embodiment, shaft-shaped heaters 58A to 58D extending along the Y direction are embedded in the barrel 50. The heaters 58A to 58D are disposed below the groove 45 of the flat screw 40 in the barrel 50. The heaters 58A to 58D are disposed in a manner that a position of each of the heaters 58A to 58D in the Z direction is the same as the position of the valve portion 73 of the discharge amount adjustment mechanism 70 in the Z direction. The heater 58A, the heater 58B, the valve portion 73 of the discharge amount adjustment mechanism 70, the heater 58C, and the heater 58D are disposed in parallel in the above order from a −X direction side to a +X direction side. The heater 58A and the heater 58B are disposed in a cross section passing through the central axis RX of the flat screw 40 and perpendicular to a central axis AX1 of the valve portion 73, in a manner that a shortest distance between the communication hole 56 and the heater 58B in the X direction which is a direction perpendicular to the central axis RX of the flat screw 40 is the same as a shortest distance between an outer peripheral edge of the groove forming surface 42 of the flat screw 40 and the heater 58A in the X direction. The heater 58C and the heater 58D are disposed in a cross section passing through the central axis RX of the flat screw 40 and perpendicular to a central axis AX1 of the valve portion 73, in a manner that a shortest distance between the communication hole 56 and the heater 58C in the X direction is the same as a shortest distance between the outer peripheral edge of the groove forming surface 42 of the flat screw 40 and the heater 58D in the X direction. Temperature of each of the heaters 58 A to 58 D is controlled by the control unit 500. The heater 58 may also be referred to as a heating unit.

The barrel 50 includes a cooling unit 90 that cools the flat screw 40 and the barrel 50. In the present embodiment, the cooling unit 90 includes a refrigerant pipe 59 embedded in the barrel 50 and a pump 103 coupled to the refrigerant pipe 59 to supply refrigerant to the refrigerant pipe 59. Each refrigerant pipe 59 is disposed at a position further away from the communication hole 56 than each heater 58. The refrigerant pipe 59 is disposed so as to pass through a vicinity of the outer peripheral edge of the groove forming surface 42 of the flat screw 40. The refrigerant pipe 59 is disposed in a cross section passing through the central axis RX of the flat screw 40 and perpendicular to the central axis AX1 of the valve portion in a manner that a shortest distance between the refrigerant pipe 59 and the communication hole 56 in X direction is longer than a shortest distance between the refrigerant pipe 59 and the outer peripheral edge of the groove forming surface 42 in the X direction which is a direction perpendicular to the central axis RX of the flat screw 40. The pump 103 is driven under the control of the control unit 500. In the present embodiment, water is used as the refrigerant. As the refrigerant, for example, a liquid such as oil or a gas such as carbon dioxide may be used. A peltier element or a heat pump may be used for the cooling unit 90.

The nozzle 61 is coupled to a lower surface of the barrel 50. The nozzle 61 is provided with a nozzle hole 62 at a tip portion of the nozzle 61 facing the shaping surface 310 of the stage 300. The nozzle hole 62 is an opening that discharges the shaping material. The second partial flow path 152 and the nozzle hole 62 of the communication hole 56 provided in the barrel 50 communicate with each other via an internal flow path 65. In the present embodiment, an opening shape of the nozzle hole 62 is circular. A diameter of the nozzle hole 62 is smaller than a diameter of the internal flow path 65. The opening shape of the nozzle hole 62 is not limited to a circular shape, and may be a square shape or the like.

Figure 2:
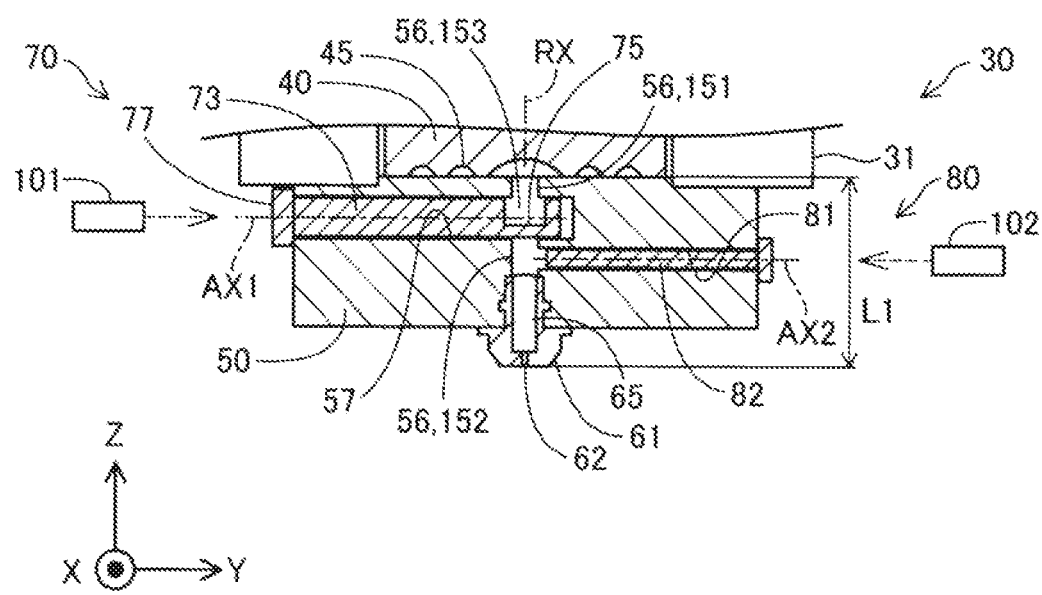
FIG. 2 is an illustrative view showing a configuration of a discharge amount adjustment mechanism and a suction unit according to the first embodiment.
Figure 3:
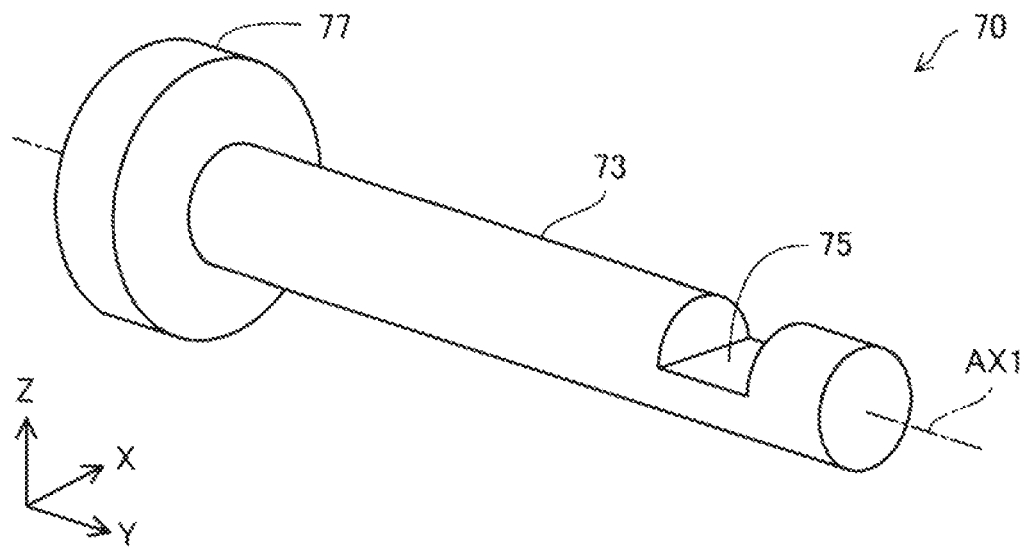
FIG. 3 is a perspective view showing a configuration of a valve portion according to the first embodiment.

FIG. 2 is an illustrative view showing a configuration of the discharge amount adjustment mechanism 70 and the suction unit 80 in the present embodiment. FIG. 3 is a perspective view showing a configuration of the valve portion 73 of the discharge amount adjustment mechanism 70 in the present embodiment. As described above, the discharge amount adjustment mechanism 70 has a columnar valve portion 73 disposed in the intersecting hole 57. The valve portion 73 has a central axis AX1. The valve portion 73 is provided with a recess 75 by partially cutting out a part of the cylindrical outer circumference in a half-moon shape. The recess 75 is disposed in the intersecting portion 153 of the communication hole 56. An operation unit 77 is provided at an end portion on a −Y direction side of the valve portion 73. A valve drive unit 101 is coupled to the operation unit 77. When the torque by the valve drive unit 101 is applied to the operation unit 77, the valve portion 73 rotates. The recess 75 may also be referred to as a flow path.

Figure 4:
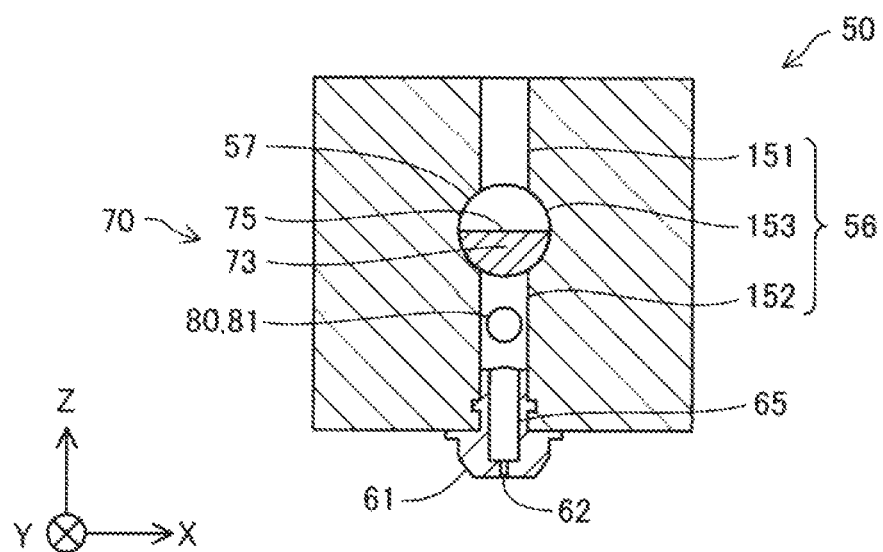
FIG. 4 is a first illustrative view showing an operation of a valve portion of the discharge amount adjustment mechanism.
Figure 5:
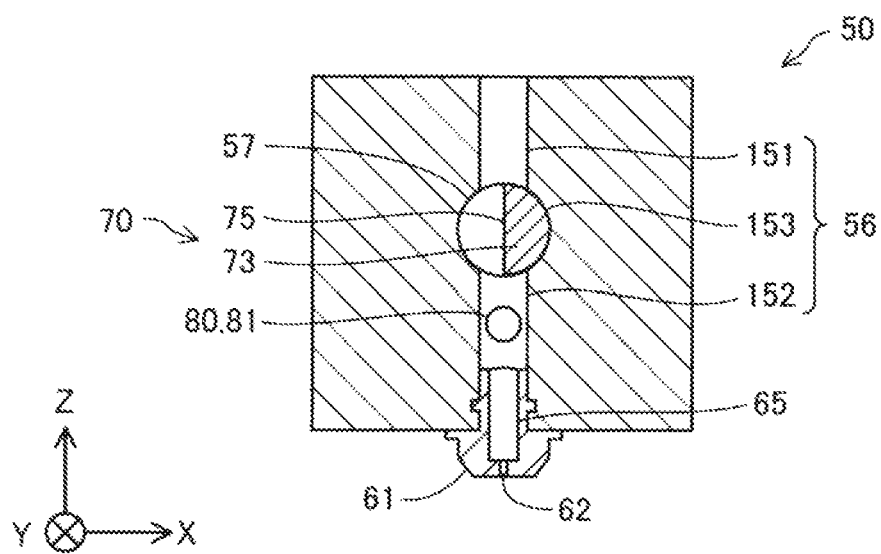
FIG. 5 is a second illustrative view showing the operation of the valve portion of the discharge amount adjustment mechanism.

FIG. 4 is a first illustrative view showing an operation of the valve portion 73 of the discharge amount adjustment mechanism 70. FIG. 5 is a second illustrative view showing an operation of the valve portion 73 of the discharge amount adjustment mechanism 70. As shown in FIG. 4, when the valve portion 73 rotates such that the recess 75 is positioned above, the second partial flow path 152 is closed by the valve portion 73, and inflow of the shaping material from the first partial flow path 151 to the second partial flow path 152 is blocked. On the other hand, as shown in FIG. 5, when the valve portion 73 rotates such that the recess 75 faces the +X direction or the −X direction, the first partial flow path 151 and the second partial flow path 152 communicate with each other, and the shaping material flows from the first partial flow path 151 to the second partial flow path 152 at a maximum flow rate. The discharge amount adjustment mechanism 70 changes a cross-sectional area of the flow path between the first partial flow path 151 and the second partial flow path 152 in response to the rotation of the valve portion 73, and changes the flow rate of the shaping material flowing from the first partial flow path 151 to the second partial flow path 152.

Referring to FIG. 2, the suction unit 80 according to the present embodiment includes a cylindrical cylinder 81 embedded in the barrel 50, a plunger 82 accommodated in the cylinder 81, and a plunger driving unit 102 that moves the plunger 82 in the cylinder 81. The cylinder 81 is coupled to the second partial flow path 152 of the communication hole 56. The plunger driving unit 102 includes a motor driven under the control of the control unit 500, and a rack and pinion that converts the rotation of the motor into translational motion along a central axis AX2 of the cylinder 81. The plunger driving unit 102 may be constituted by a motor driven under the control of the control unit 500 and a ball screw that converts the rotation of the motor into translational motion along the central axis AX2 of the cylinder 81, or may be constituted by an actuator such as a solenoid mechanism or a piezo element.

Figure 6:
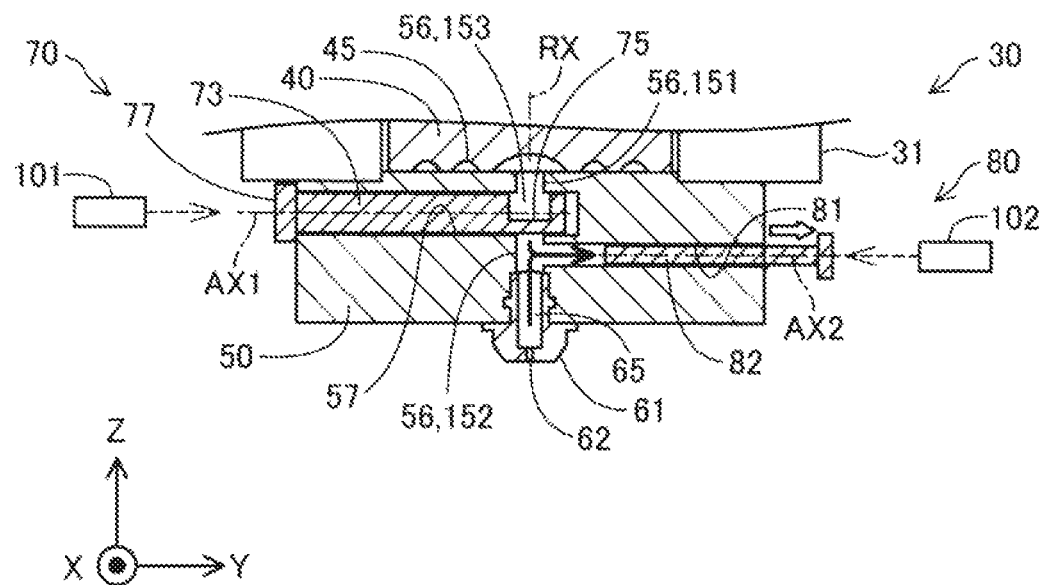
FIG. 6 is an illustrative view showing an operation of a plunger of the suction unit.

FIG. 6 is an illustrative view showing an operation of the plunger 82 of the suction unit 80. When the plunger 82 moves in a direction away from the second partial flow path 152 of the communication hole 56, a negative pressure is generated in the cylinder 81, so that the shaping material in the second partial flow path 152 is drawn into the cylinder 81 as indicated by an arrow in FIG. 6. As the shaping material in the second partial flow path 152 is drawn into the cylinder 81, the shaping material in the nozzle 61 is drawn into the second partial flow path 152. Therefore, when the discharge of the shaping material from the nozzle 61 is stopped, the shaping material in the second partial flow path 152 is suctioned into the cylinder 81, so that the shaping material discharged from the nozzle 61 can be cut off. On the other hand, when the plunger 82 moves in a direction closer to the second partial flow path 152, the shaping material in the cylinder 81 is pushed into the second partial flow path 152 by the plunger 82. Therefore, when the discharge of the shaping material from the nozzle 61 is restarted, the shaping material in the cylinder 81 is pushed into the second partial flow path 152, thereby responsivity of the discharge of the shaping material from the nozzle 61 can be improved. The movement of the plunger 82 in the direction away from the second partial flow path 152 is also referred to as pulling the plunger 82. The movement of the plunger 82 in the direction closer to the second partial flow path 152 is referred to as pushing the plunger 82.

Figure 7:
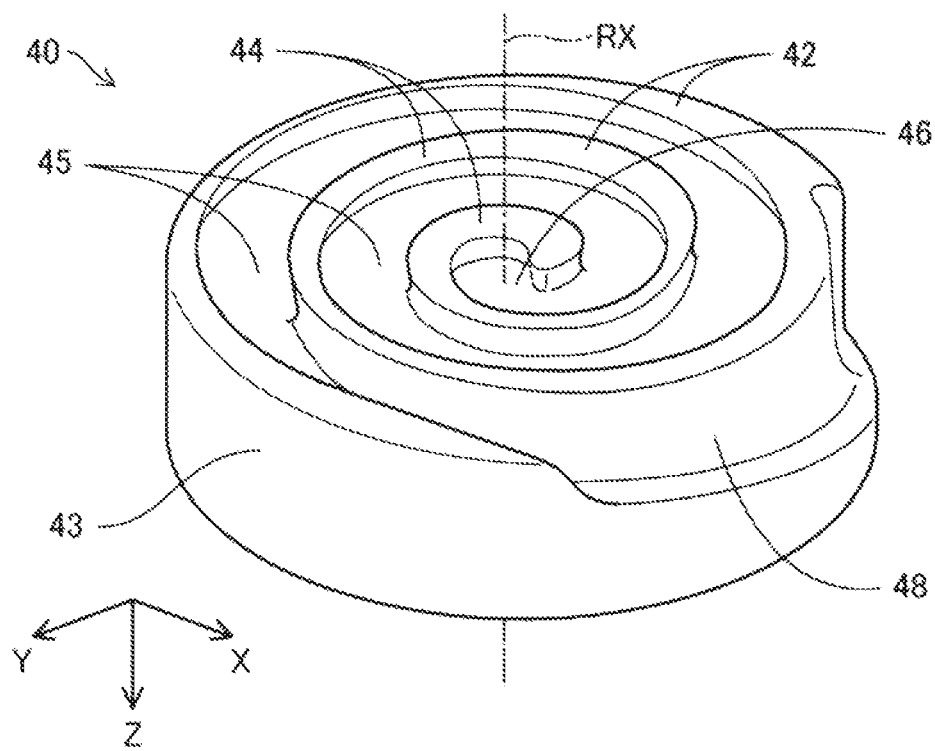
FIG. 7 is a perspective view showing a configuration of a groove forming surface of a flat screw.

FIG. 7 is a perspective view showing a configuration of the groove forming surface 42 of the flat screw 40 in the present embodiment. In order to facilitate understanding of the technology, the flat screw 40 in FIG. is shown in a reversed state of a vertical positional relationship shown in FIG. 1. The groove forming surface 42 of the flat screw 40 is provided with a central portion 46, a groove 45, and a material introduction port 48. The central portion 46 is a depression formed around the central axis RX of the flat screw 40. The central portion 46 faces the communication hole 56 of the barrel 50.

The groove 45 is a groove that extends spirally around the central axis RX of the flat screw 40 in a manner of drawing an arc toward the outer periphery of the groove forming surface 42. The groove 45 may be configured to extend in an involute curve shape or a spiral shape. One end of the groove 45 is coupled to the central portion 46, and the other end of the groove 45 is coupled to the material introduction port 48. Adjacent grooves 45 are partitioned by ridge portions 44.

The material introduction port 48 is provided on a side surface 43 of the flat screw 40. The material introduction port 48 introduces the material supplied from the material supply unit 20 through the supply path 22 into the groove 45. Although a mode is illustrated in FIG. 7, in which one groove 45 extending from the central portion 46 toward the outer periphery of the flat screw 40 and one material introduction port 48 are provided, a plurality of grooves 45 extending from the central portion 46 toward the outer periphery of the flat screw 40 and a plurality of material introduction ports 48 may be provided.

Figure 8:
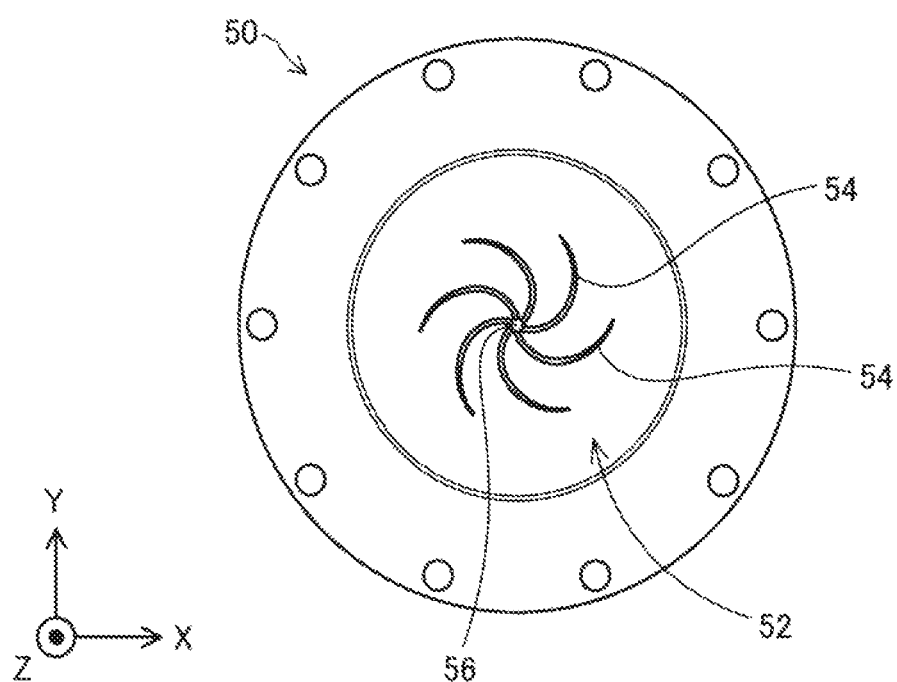
FIG. 8 is a top view showing a configuration of a screw facing surface of a barrel.

FIG. 8 is a top view showing a configuration of the screw facing surface 52 of the barrel 50 according to the present embodiment. As described above, the communication hole 56 communicating with the nozzle 61 is formed at the center of the screw facing surface 52. A plurality of guide grooves 54 are formed around the communication hole 56 in the screw facing surface 52. One end of each guide groove 54 is coupled to the communication hole 56, and extends spirally from the communication hole 56 toward the outer periphery of the screw facing surface 52. Each of the guide grooves 54 has a function of guiding the shaping material to the communication hole 56.

Figure 9:
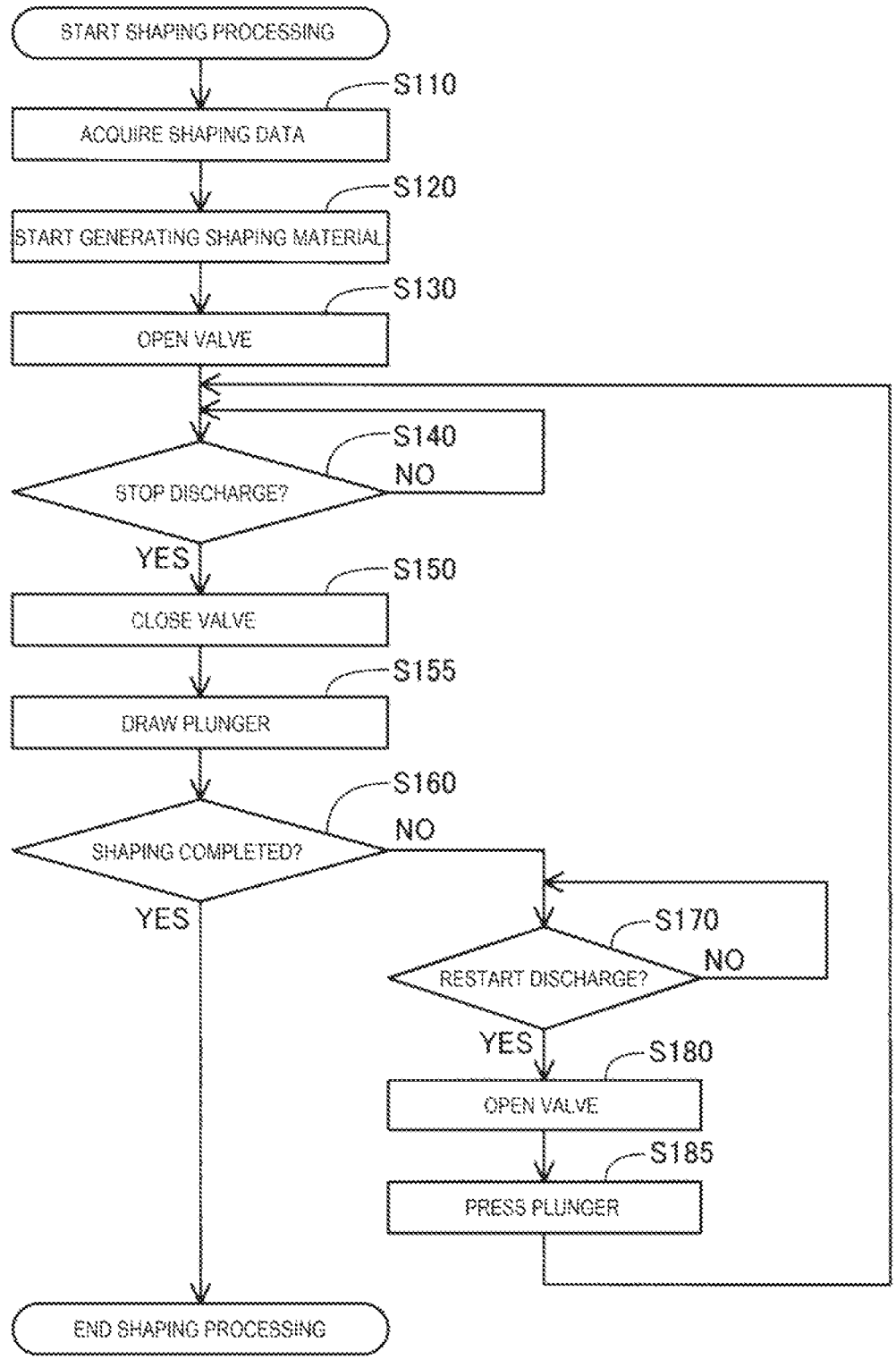
FIG. 9 is a flowchart showing a content of a shaping processing.

FIG. 9 is a flowchart showing a content of the shaping processing according to the present embodiment. The processing is executed by the control unit 500 when a user performs a predetermined start operation on an operation panel provided in the three-dimensional shaping device 100 or a computer coupled to the three-dimensional shaping device 100.

First, in step S110, the control unit 500 acquires shaping data for shaping a three-dimensional shaped object OB. The shaping data is data which represents information related to a moving path of the nozzle 61 with respect to the shaping surface 310 of the stage 300, an amount of the shaping material discharged from the nozzle 61, a rotational speed of the driving motor 32 that rotates the flat screw 40, or the temperature of the heater 58 built in the barrel 50. The shaping data is generated by, for example, slicer software installed in a computer coupled to the three-dimensional shaping device 100. The slicer software reads shape data representing a shape of the three-dimensional shaped object OB that is generated using three-dimensional CAD software or three-dimensional CG software, divides the shape of the three-dimensional shaped object OB into layers having a predetermined thickness to generate the shaping data. The shape data read by the slicer software is data in an STL format, an AMF format, or the like. The shaping data created by the slicer software is represented by a G code, an M code, or the like. The control unit 500 acquires the shaping data from the computer coupled to the three-dimensional shaping device 100 or a recording medium such as a USB memory.

Next, in step S120, the control unit 500 starts generating the shaping material. The control unit 500 controls the rotation of the flat screw 40 and the temperature of the heater 58 in accordance with the shaping data to melt the material and to generate the shaping material. By the rotation of the flat screw 40, the material supplied from the material supply unit 20 is introduced into the groove 45 from the material introduction port 48 of the flat screw 40. The material introduced into the groove 45 is conveyed to the central portion 46 along the groove 45. The material conveyed in the groove 45 is sheared by relative rotation between flat screw 40 and barrel 50, and at least a part of the material is melted by heating with the heater 58, resulting in a shaping material in a paste form having fluidity. The shaping material collected in the central portion 46 is pressure-fed from the communication hole 56 to the nozzle 61. The shaping material continues to be generated while the process is performed.

In step S130, the control unit 500 controls the discharge amount adjustment mechanism 70 to communicate the first partial flow path 151 with the second partial flow path 152 of the communication hole 56, so as to start discharging the shaping material from the nozzle 61. By starting the discharge of the shaping material from the nozzle 61, shaping of the three-dimensional shaped object OB is started.

In step S140, the control unit 500 determines whether the discharge of the shaping material from the nozzle 61 is stopped. If it is determined in step S140 that the discharge of the shaping material from the nozzle 61 is not stopped, the control unit 500 continues the shaping of the three-dimensional shaped object OB while repeating the process of step S140 until it is determined that the discharge of the shaping material from the nozzle 61 is stopped. On the other hand, if it is determined in step S140 that the discharge of the shaping material from the nozzle 61 is stopped, in step S150, the control unit 500 controls the discharge amount adjustment mechanism 70 to block inflow of the shaping material from the first partial flow path 151 to the second partial flow path 152 of the communication hole 56. By blocking the inflow of the shaping material from the first partial flow path 151 to the second partial flow path 152, the discharge of the shaping material from the nozzle 61 is stopped. When the discharge of the shaping material from the nozzle 61 is stopped, in step S155, the control unit 500 controls the plunger driving unit 102 to draw the shaping material remaining in the nozzle 61 or the second partial flow path 152 into the cylinder 81 by pulling the plunger 82.

Thereafter, in step S160, the control unit 500 determines whether the shaping of the three-dimensional shaped object OB was completed. If it is determined in step S160 that the shaping of the three-dimensional shaped object OB was completed, the control unit 500 ends the processing. On the other hand, if it is determined in step S160 that the shaping of the three-dimensional shaped object OB has not been completed, in step S170, the control unit 500 determines whether to restart the discharge of the shaping material from the nozzle 61.

If it is determined in step S170 that the discharge of the shaping material from the nozzle 61 is not restarted, the control unit 500 waits for shaping of the three-dimensional shaped object OB while repeating the process of step S170 until it is determined that the discharge of the shaping material from the nozzle 61 is restarted. On the other hand, if it is determined in step S170 that the discharge of the shaping material from the nozzle 61 is restarted, in step S180, the control unit 500 controls the discharge amount adjustment mechanism 70 to communicate the first partial flow path 151 with the second partial flow path 152. By communicating the first partial flow path 151 with the second partial flow path 152, discharge of the shaping material from the nozzle 61 is restarted. When the discharge of the shaping material from the nozzle 61 is restarted, in step S185, the control unit 500 controls the plunger driving unit 102 to push the plunger 82. When the plunger 82 is pushed, the shaping material in the cylinder 81 is discharged into the second partial flow path 152, so that the discharge of the shaping material from the nozzle 61 is quickly restarted.

Figure 10:
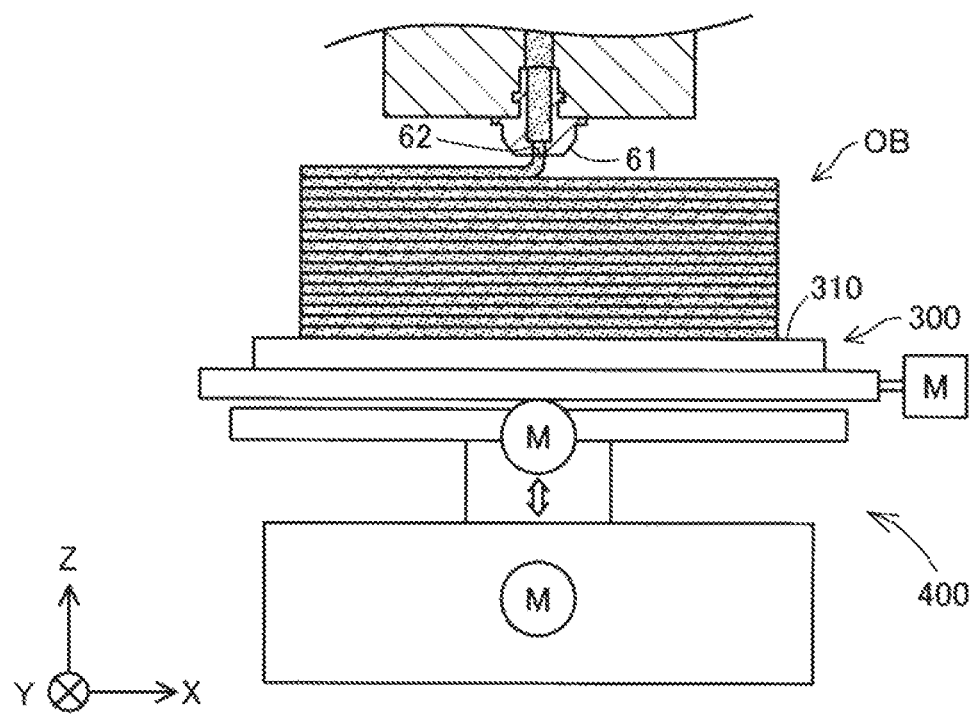
FIG. 10 is an illustrative diagram schematically showing a state in which a three-dimensional shaped object is shaped.

FIG. 10 is an illustrative diagram schematically showing a state in which the three-dimensional shaped object OB is shaped. After step S185 shown in FIG. 9, the processing of the control unit 500 returns to step S140, and the control unit 500 continues shaping of the three-dimensional shaped object OB until it is determined in step S160 that the shaping of the three-dimensional object OB was completed. In this manner, a three-dimensional shaped object OB having a desired shape is formed on the stage 300.

Figure 11:
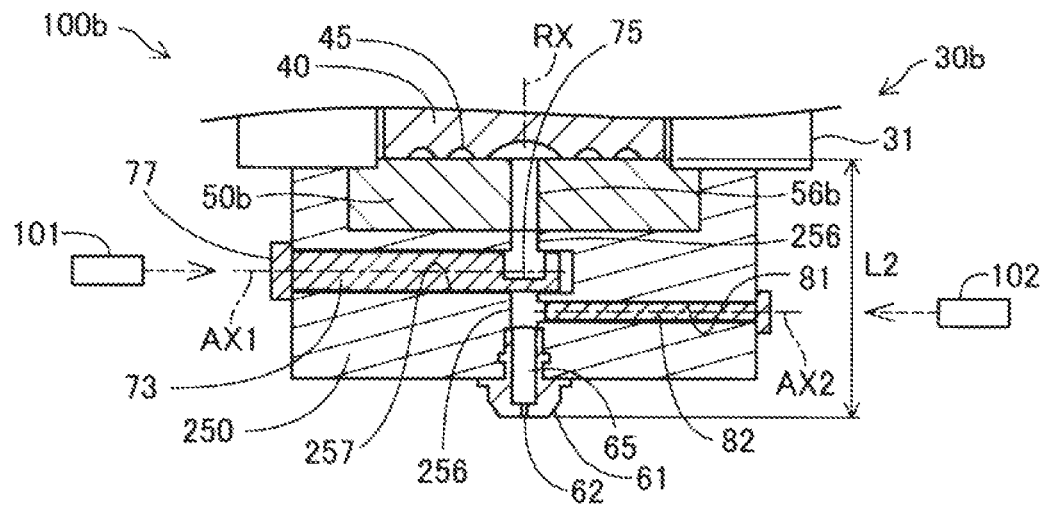
FIG. 11 is an illustrative view showing a three-dimensional shaping device according to a comparative example.

FIG. 11 is an illustrative view showing a three-dimensional shaping device 100b in a comparative example. Different from the present embodiment, in the comparative example, a flow path structure 250 is provided between a barrel 50b and the nozzle 61, and the discharge amount adjustment mechanism 70 and the suction unit 80 are provided in the flow path structure 250 instead of the barrel 50b. That is, different from the present embodiment, in the comparative example, the discharge amount adjustment mechanism 70 and the suction unit 80 are constituted as separate units from the barrel 50. Other configurations are the same as those of the present embodiment unless otherwise described. The barrel 50b is provided with a first communication hole 56b. The flow path structure 250 is provided with a second communication hole 256 communicating the first communication hole 56b of the barrel 50b with the nozzle 61, and an intersecting hole 257 intersecting the second communication hole 256. The first communication hole 56b and the second communication hole 256 extend on the central axis RX of the flat screw 40 along the Z direction. The valve portion 73 of the discharge amount adjustment mechanism 70 is disposed in the intersecting hole 257. The cylinder 81 of the suction unit is coupled to the second communication hole 256. A shortest distance L2 from the screw facing surface 52b to the opening of the nozzle hole 62 in the comparative example is longer than a shortest distance L1 from the screw facing surface 52 to the opening of the nozzle hole 62 in the present embodiment. Therefore, a pressure loss of the shaping material when the shaping material flows from the screw facing surface 52b to the opening of the nozzle hole 62 in the comparative example is larger than the pressure loss of the shaping material when the shaping material flows from the screw facing surface 52 to the opening of the nozzle hole 62 in the present embodiment.

According to the three-dimensional shaping device 100 of the present embodiment described above, since the supply of the shaping material to the nozzle 61 can be stopped by the discharge amount adjustment mechanism 70 provided in the barrel 50, it is possible to prevent unintentional discharge of the shaping material from the nozzle 61. Therefore, it is possible to prevent the material unintentionally discharged from the nozzle 61 from adhering to the three-dimensional shaped object OB, and thus prevent reduction of dimensional accuracy of the three-dimensional shaped object OB. In particular, in the present embodiment, since the barrel 50 and the discharge amount adjustment mechanism 70 are constituted in one unit, the shortest distance L1 from the screw facing surface 52 to the opening of the nozzle hole 62 can be set shorter than that in a configuration in which the barrel 50 and the discharge amount adjustment mechanism 70 are constituted as separate units. Therefore, since the pressure loss of the shaping material when the shaping material flows from the screw facing surface 52 to the opening of the nozzle hole 62 can be set to be small, it is possible to easily ensure the discharge amount of the shaping material from the nozzle 61. Further, since the minimum distance between the heater 58 incorporated in the barrel 50 and the nozzle 61 can be set to be short by constituting the barrel 50 and the discharge amount adjustment mechanism 70 in one unit, the heater 58 provided in the barrel 50 can heat the shaping material in the second partial flow path 152 of the communication hole 56 and the nozzle 61. Therefore, the structure can be simplified and the control of the temperature of the heater 58 by the control unit 500 can be easier as compared with a configuration in which a heater is separately provided in the vicinity of the second partial flow path 152 or in the vicinity of the nozzle 61 in order to heat the shaping material in the second partial flow path 152 or in the nozzle 61.

In the present embodiment, the control unit 500 controls the valve drive portion 101 to rotate the valve portion 73, thereby switching between start and stop of the supply of the shaping material to the nozzle 61. Therefore, the start and stop of the discharge of the shaping material from the nozzle 61 can be switched by a simple configuration.

In the present embodiment, since the vicinity of the outer peripheral edge of the groove forming surface 42 of the flat screw 40 can be cooled by the cooling unit 90, it is possible to prevent the temperature in the vicinity of the outer peripheral edge of the groove forming surface from becoming too high and to prevent the material conveyance from being hindered. Therefore, the material can be easily conveyed from the outer peripheral edge of the groove forming surface 42 toward the central axis RX.

In the present embodiment, when the discharge of the shaping material from the nozzle 61 is stopped, the shaping material in the second partial flow path 152 of the communication hole 56 can be suctioned by the suction unit 80. Therefore, when the discharge of the shaping material from the nozzle 61 is stopped by the discharge amount adjustment mechanism 70, the discharge of the shaping material from the nozzle 61 can be stopped more quickly.

Although the ABS resin in a pellet form is used as the material in the present embodiment, an example of the material that is used in the shaping head 200 may include a material for shaping the three-dimensional shaped object that uses various materials such as a thermoplastic material, a metal material, and a ceramic material as a main material. Here, the "main material" means a material serving as a main component used for shaping the shape of the three-dimensional shaped object and means a material that occupies a content of 50% by weight or more in the three-dimensional shaped object. The shaping material described above includes a material obtained by melting one of the main materials as a simple substance, or a material obtained by melting a part of components containing the main materials into a paste form.

When a thermoplastic material is used as the main material, the shaping material is generated by plasticizing the material in the melting unit 30. "Plasticize" means to melt the thermoplastic material by heating the thermoplastic material. In addition, "melt" means that a thermoplastic material is softened by being heated to a temperature equal to or higher than a glass transition point, thereby exhibiting fluidity.

As the thermoplastic material, for example, any one thermoplastic resin material or a combination of two or more thermoplastic resin materials listed below can be used.

Examples of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamide-imide, polyetherimide, and polyether ether ketone (PEEK)

Additives such as a pigment, a metal, a ceramic, and other additives such as a wax, a flame retardant, an antioxidant, and a heat stabilizer may be mixed into the thermoplastic material. The thermoplastic material is converted into a melted state after being plasticized by the rotation of the flat screw 40 and the heating of the heater 58 in the melting unit 30. The shaping material generated in such a manner is discharged from the nozzle hole 62 and thereafter is hardened due to low temperature.

It is desirable that the thermoplastic material is emitted from the nozzle hole 62 in a completely melted state after being heated to the temperature equal to or higher than the glass transition point. The term "completely melted state" means a state in which no unmelted thermoplastic material is present. For example, when a pellet-shaped thermoplastic resin is used as a material, the "completely melted state" means a state in which a pellet-shaped solid matter does not remain.

The following metal material, for example, may be used as the main material in the shaping head 200 instead of the above-described thermoplastic material. In this case, it is desirable that a powder material obtained by making the following metal materials into a powder form is mixed with a component that melts at the time of generating the shaping material, and is put into the melting unit 30.

Examples of Metal Material

Single metals such as magnesium (Mg), iron (Fe), cobalt (Co), chromium (Cr), aluminum (Al), titanium (Ti), copper (Cu), nickel (Ni), or an alloy containing one or more of the metals Examples of Alloy Maraging steel, stainless steel, a cobalt chrome molybdenum alloy, a titanium alloy, a nickel alloy, an aluminum alloy, a cobalt alloy, and a cobalt chromium alloy A ceramic material can be used as the main material in the shaping head 200 instead of the above-described metal materials. As the ceramic material, for example, an oxide ceramic such as silicon dioxide, titanium dioxide, aluminum oxide, zirconium oxide, and a non-oxide ceramic such as aluminum nitride can be used. When the metal material or the ceramic material as described above is used as the main material, the shaping material disposed on the stage 300 may be hardened by, for example, irradiating with a laser and sintering with warm air or the like.

A powder material of the metal material or the ceramic material that is put into the material supply unit 20 may be a mixed material obtained by mixing a plurality of powders of single metals, a plurality of powders of alloys, and a plurality of powders of ceramic materials. The powder material of the metal material or the ceramic material may be coated with, for example, a thermoplastic resin as exemplified above, or a thermoplastic resin other than the thermoplastic resins. In this case, in the melting unit 30, the thermoplastic resin may be melted to exhibit fluidity.

For example, the following solvents may be added to the powder material of the metal material or the ceramic material that is put into the material supply unit 20. One solvent or a combination of two or more solvents selected from the following solvents may be used.

Examples of Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2-6-lutidine; tetraalkylammonium acetates (such as tetrabutylammonium acetate); and ionic liquids such as butyl carbitol acetate In addition, the following binder, for example, may be added to the powder material of the metal material or the ceramic material that is put into the material supply unit 20.

Examples of Binder

Figure 12:
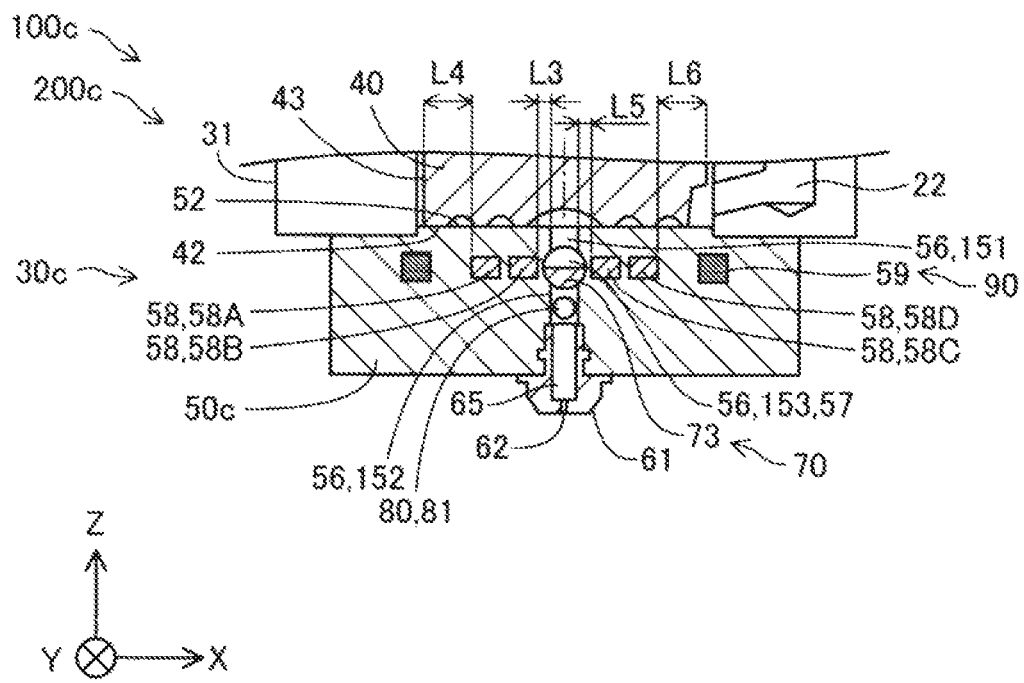
FIG. 12 is an illustrative diagram showing a schematic configuration of a three-dimensional shaping device according to a second embodiment.

An acrylic resin, an epoxy resin, a silicone resin, a cellulose-based resin or other synthetic resins, and a polylactic acid (PLA), a polyamide (PA), a polyphenylene sulfide (PPS), a polyether ether ketone (PEEK) or other thermoplastic resins B. Second Embodiment FIG. 12 is an illustrative diagram showing a schematic configuration of a three-dimensional shaping device 100*c* according to the second embodiment. In the second embodiment, the arrangement of the heaters 58A to 58D in a barrel 50*c* of a melting unit 30*c* having a shaping head 200*c* is different from the arrangement in the first embodiment. Other configurations are the same as those of the first embodiment shown in FIG. 1 unless otherwise specified.

In the present embodiment, the heater 58A and the heater 58B are disposed in the barrel 50*c* in the cross section passing through the central axis RX of the flat screw 40 and perpendicular to the central axis AX1 of the valve portion 73, in a manner that a shortest distance L3 between the communication hole 56 and the heater 58B in the X direction which is the direction perpendicular to the central axis RX of the flat screw 40 is shorter than a shortest distance L4 between the outer peripheral edge of the groove forming surface 42 of the flat screw 40 and the heater 58A in the X direction. The heater 58A and the heater 58B are disposed in the barrel 50*c* in the cross section passing through the central axis RX of the flat screw 40 and perpendicular to the central axis AX1 of the valve portion 73, in a manner that a shortest distance L5 between the communication hole 56 and the heater 58C in the X direction is shorter than a shortest distance L6 between the outer peripheral edge of the groove forming surface 42 of the flat screw 40 and the heater 58D in the X direction.

According to the three-dimensional shaping device 100*c* of the present embodiment described above, the shortest distance between the heaters 58A to 58D and the communication hole 56 can be set to be short, and the shortest distance between the heaters 58A to 58D and the outer peripheral edge of the groove forming surface 42 can be set to be long. Therefore, by heating from the heaters 58A to 58D, and fluidity of the shaping material flowing through the communication hole 56 can be improved when the material supplied to the groove 45 of the flat screw 40 is melted. In particular, in the present embodiment, the shortest distance between the heaters 58A to 58D and the nozzle 61 can be set to be short. Therefore, the fluidity of the shaping material discharged from the nozzle 61 can be improved by heating from the heaters 58A to 58D.

Figure 13:
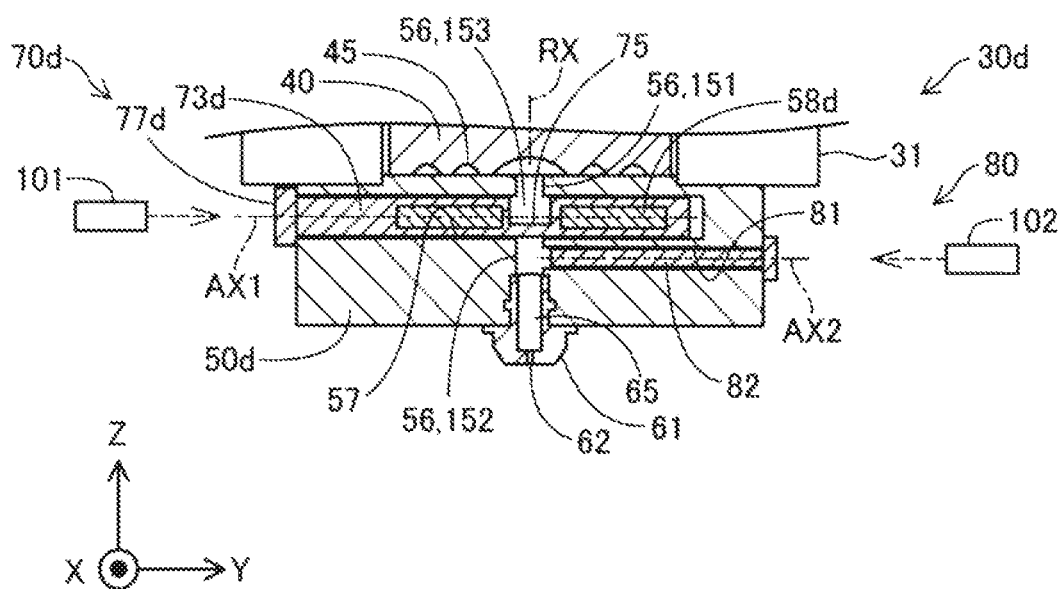
FIG. 13 is an illustrative diagram showing a schematic configuration of a three-dimensional shaping device according to another embodiment.

C. Other Embodiments (C1) FIG. 13 is an illustrative diagram showing a configuration of a three-dimensional shaping device 100*d* according to another embodiment. The heater 58 that heats the material supplied to the groove 45 of the flat screw 40 is embedded in the main bodies of the barrels 50 and 50c in the melting units 30 and 30c of the three-dimensional shaping devices 100 and 100c of the embodiments described above. In contrast, as shown in FIG. 13, in a melting unit 30d of the three-dimensional shaping device 100d, a heater 58d that heats the material supplied to the groove 45 may be embedded in a valve portion 73d of a discharge amount adjustment mechanism 70d instead of the main body of a barrel 50d. An intersecting hole 57d provided in the barrel 50d may extend from a side surface on the −Y direction side of the barrel 50d to the vicinity below the outer peripheral edge of the groove forming surface 42 of the flat screw 40 on the +Y direction side. The intersecting hole 57d may pass through the barrel 50d. The valve portion 73d of the discharge amount adjustment mechanism 70d may extend to the vicinity below the outer peripheral edge of the groove forming surface 42 of the flat screw 40 on the +Y direction side. The heater 58d is preferably disposed below the groove 45 in the valve portion 73d. Thermal conductivity of an operation unit 77d of the discharge amount adjustment mechanism 70d is preferably set to be smaller than thermal conductivity of the valve portion 73d. For example, the thermal conductivity of the operation unit 77d can be set to be smaller than the thermal conductivity of the valve portion 73d by using a material having a lower thermal conductivity than that of the material of the valve portion 73d in the material of the operation unit 77d. The thermal conductivity of the operation unit 77d can be set to be smaller than the thermal conductivity of the valve portion 73d by forming a zirconia coating on the operation unit 77d. By setting the thermal conductivity of the operation unit 77d to be smaller than the thermal conductivity of the valve portion 73d, the heat of the heater 58d can be prevented from being transmitted to the valve drive portion 101 via the operation unit 77d. Therefore, temperature of the valve drive unit 101 prevented from being excessively high.

(C2) In the three-dimensional shaping devices 100 and 100c of the embodiments described above, the discharge amount adjustment mechanism 70 may be, for example, a gate valve, a globe valve, a ball valve, or the like instead of the valve portion 73 provided with the recess 75.

(C3) In the three-dimensional shaping devices 100 and 100c of the embodiments described above, the suction unit 80 is provided. In contrast, the suction unit 80 may not be provided in the three-dimensional shaping devices 100 and 100c.

(C4) In the three-dimensional shaping device 100 and 100c of the embodiments described above, the cooling unit 90 is provided inside the barrels 50 and 50c. In contrast, the cooling unit 90 may be provided outside the barrels 50 and 50c. For example, the cooling unit 90 may be provided in the vicinity of the outer peripheral portion of the groove forming surface 42 of the flat screw 40 inside the screw case 31. The cooling unit 90 may not be provided in the three-dimensional shaping devices 100 and 100c.

(C5) In the three-dimensional shaping devices 100 and 100c of the embodiments described above, the refrigerant pipe 59 is disposed in the barrel 50c in the cross section passing through the central axis RX of the flat screw 40 and perpendicular to the central axis AX1 of the valve portion 73 in a manner that the shortest distance between the refrigerant pipe 59 and the communication hole 56 in the X direction is longer than the shortest distance between the refrigerant pipe 59 and the outer peripheral edge of the groove forming surface 42 in the X direction which is the direction perpendicular to the central axis RX of the flat screw 40. In contrast, the refrigerant pipe 59 is disposed in the cross section passing through the central axis RX of the flat screw 40 and perpendicular to the central axis AX1 of the valve portion 73 in a manner that the shortest distance between the refrigerant pipe 59 and the communication hole 56 in a direction perpendicular to the central axis RX of the flat screw 40 is longer than the shortest distance between the refrigerant pipe 59 and the outer peripheral edge of the groove forming surface 42 in the direction perpendicular to the central axis RX of the flat screw 40. For example, the refrigerant pipe 59 is disposed in the barrel 50c in the cross section passing through the central axis RX of the flat screw 40 and perpendicular to the central axis AX1 of the valve portion in a manner that the shortest distance between the refrigerant pipe 59 and the communication hole 56 in X direction is the same as the shortest distance between the refrigerant pipe 59 and the outer peripheral edge of the groove forming surface 42 in the X direction.

(C6) In the three-dimensional shaping devices 100 and 100c of the embodiments described above, the melting units 30 and 30c include the flat screw 40 having a flat cylindrical shape and respective barrels 50 and 50c each having the flat screw 52 facing surface. In contrast, the melting units 30 and 30c may include an in-line screw having an elongated axial outer shape and a spiral groove formed on the side surface of an axis, and a barrel having a cylindrical screw facing surface.

D. Other Forms

The present disclosure is not limited to the embodiments described above, and can be implemented in various forms without departing from the scope of the present disclosure. For example, the present disclosure can be implemented by the following forms. In order to solve some or all of the problems described in the present disclosure, or to achieve some or all of the effects of the present disclosure, technical features of the embodiments described above corresponding to technical features to be described below of the embodiments can be replaced or combined as appropriate. In addition, unless described as essential herein, the technical features can be deleted as appropriate.

(1) According to one aspect of the present disclosure, a three-dimensional shaping device is provided. The three-dimensional shaping device includes a melting unit that is configured to melt a material into a shaping material, and a nozzle that is configured to discharge the shaping material supplied from the melting unit toward a stage. The melting unit has a screw that is configured to rotate about a rotation axis and has a groove forming surface in which a groove to which the material is supplied is formed, a heating unit that is configured to heat the material supplied to the groove, a barrel that has a facing surface facing the groove forming surface and is provided with a communication hole that communicates the facing surface with the nozzle, and a discharge amount adjustment mechanism that is provided in the communication hole and is configured to adjust a flow rate of the shaping material discharged from the nozzle.

According to the three-dimensional shaping device of the aspect, since the supply of the shaping material to the nozzle can be stopped by the discharge amount adjustment mechanism, it is possible to prevent unintentional discharge of the shaping material from the nozzle. Therefore, it is possible to prevent the material unintentionally discharged from the nozzle from adhering to the three-dimensional shaped object, and thus prevent a reduction of dimensional accuracy of the three-dimensional shaped object.

(2) The three-dimensional shaping device of the above aspect includes a control unit that is configured to control the discharge amount adjustment mechanism, in which the discharge amount adjustment mechanism is configured to be rotatable about a central axis intersecting the communication hole, and includes a valve portion that has a flow path through which the shaping material flows, the communication hole has a first partial flow path that is a flow path between the facing surface and the valve portion, and has a second partial flow path that is a flow path between the valve portion and the nozzle and communicates with the first partial flow path via the flow path, and the control unit may adjust a flow rate of the shaping material discharged from the nozzle by rotating the valve portion to change a flow path cross-sectional area of a coupling part between the flow path and the second partial flow path.

According to the three-dimensional shaping device of the aspect, start and stop of the supply of the shaping material to the nozzle can be switched by the rotation of the valve portion. Therefore, the start and stop of the discharge of the shaping material from the nozzle can be switched by a simple configuration.

(3) In the three-dimensional shaping device of the above aspect, the heating unit is disposed in the barrel, and a shortest distance between the heating unit and the communication hole of the barrel is shorter than a shortest distance between the heating unit and an outer peripheral edge of the screw in a direction perpendicular to the rotation axis of the screw.

According to the three-dimensional shaping device of the aspect, heat from the heating unit can be easily transmitted to the shaping material in the communication hole. Therefore, fluidity of the shaping material supplied to the nozzle via the communication hole can be increased.

(4) In the three-dimensional shaping device of the above aspect, the barrel has a cooling unit, and a shortest distance between the cooling unit and the communication hole of the barrel is longer than a shortest distance between the cooling unit and the outer peripheral edge of the screw in the direction perpendicular to the rotation axis of the screw.

According to the three-dimensional shaping device of the aspect, the vicinity of the outer peripheral edge of the screw can be cooled by the cooling unit. Therefore, the material can be easily conveyed from the outer peripheral edge of the screw toward the central axis by the rotation of the screw.

(5) The three-dimensional shaping device includes a suction unit that is coupled to the communication hole between the discharge amount adjustment mechanism and the nozzle and is configured to suction the shaping material from the communication hole.

According to the three-dimensional shaping device of the aspect, it is possible to suction the shaping material in the communication hole between the discharge amount adjustment mechanism and the nozzle by the suction unit. Therefore, when the supply of the shaping material to the nozzle is stopped by the discharge amount adjustment mechanism, the discharge of the shaping material from the nozzle can be stopped more quickly.

The present disclosure may be implemented in various forms other than the three-dimensional shaping device. For example, the present disclosure can be implemented in a form of a shaping head, a barrel, or the like.

What is claimed is:

1. A three-dimensional shaping device comprising:
   a melting unit configured to melt a material into a shaping material; and
   a nozzle configured to discharge the shaping material supplied from the melting unit toward a stage, wherein
   the melting unit includes
   a flat screw configured to rotate about a rotation axis and having a groove forming surface in which a groove to which the material is supplied is formed, the flat screw having a shape in which a height of the flat screw in a direction along the rotation axis is less than a diameter of the flat screw;
   a heating unit configured to heat the material supplied to the groove;
   a barrel having a facing surface that faces the groove forming surface and provided with a communication hole that communicates the facing surface with the nozzle;
   a discharge amount adjustment mechanism provided in the communication hole and configured to adjust a flow rate of the shaping material discharged from the nozzle; and
   a suction unit coupled to the communication hole between the discharge amount adjustment mechanism and the nozzle, the suction unit being configured to suction the shaping material from the communication hole.

2. The three-dimensional shaping device according to claim 1, further comprising:
   a control unit configured to control the discharge amount adjustment mechanism, wherein
   the discharge amount adjustment mechanism is configured to be rotatable about a central axis intersecting the communication hole, and includes a valve portion that has a flow path through which the shaping material flows,
   the communication hole has a first partial flow path that is a flow path between the facing surface and the valve portion, and has a second partial flow path that is a flow path between the valve portion and the nozzle and communicates with the first partial flow path via the flow path, and
   the control unit adjusts a flow rate of the shaping material discharged from the nozzle by rotating the valve portion to change a flow path cross-sectional area of a coupling part between the flow path and the second partial flow path.

3. The three-dimensional shaping device according to claim 1, wherein
   the heating unit is disposed in the barrel, and
   a shortest distance between the heating unit and the communication hole of the barrel is shorter than a shortest distance between the heating unit and an outer peripheral edge of the screw in a direction perpendicular to the rotation axis of the screw.

4. The three-dimensional shaping device according to claim 1, wherein
   the barrel includes a cooling unit, and
   a shortest distance between the cooling unit and the communication hole of the barrel is longer than a shortest distance between the cooling unit and the outer peripheral edge of the screw in the direction perpendicular to the rotation axis of the screw.

* * * * *